Jan. 17, 1939. A. R. DE TARTAS 2,143,867
MOTION PICTURE PROJECTOR
Filed March 25, 1936 3 Sheets-Sheet 1
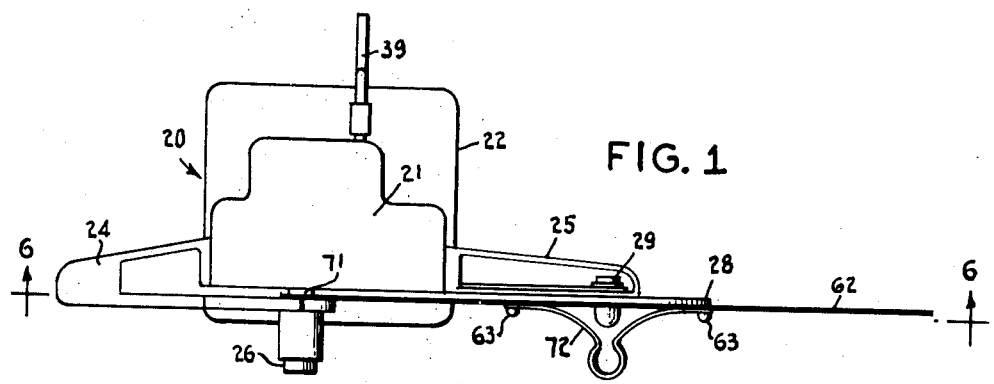
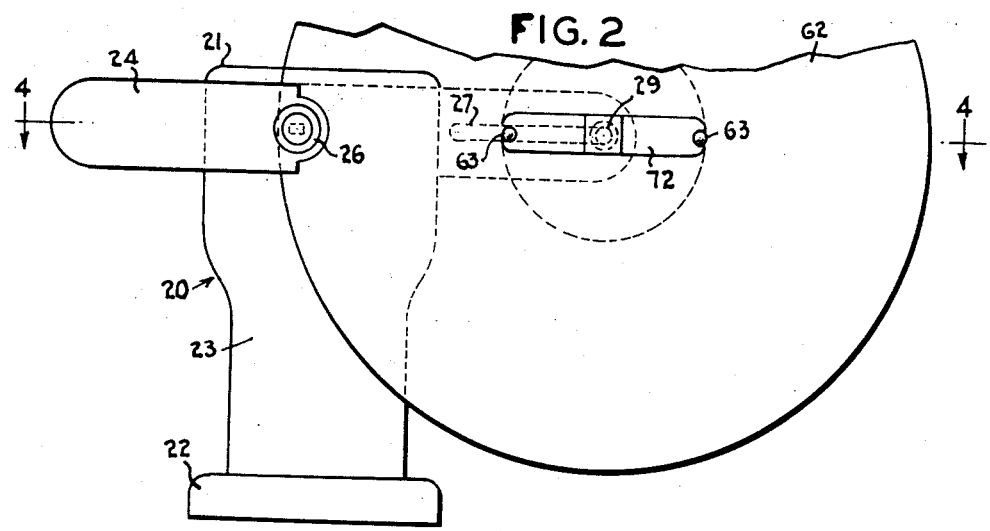
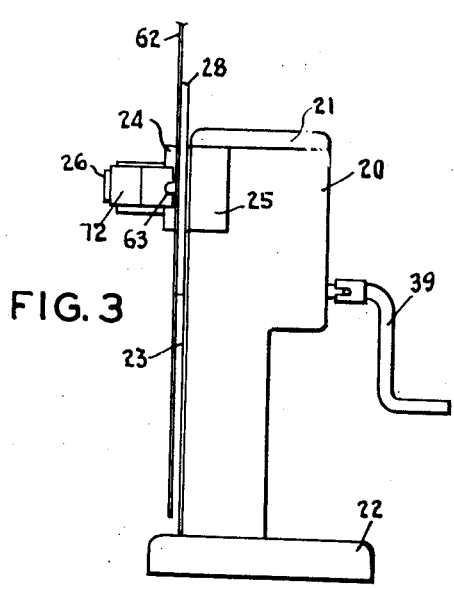
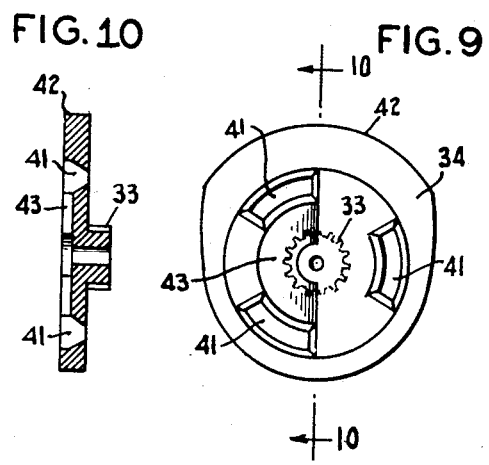
INVENTOR.
Augustus R de Tartas
BY M. Theodore Simmons
ATTORNEY.

Jan. 17, 1939.  A. R. DE TARTAS  2,143,867
MOTION PICTURE PROJECTOR
Filed March 25, 1936  3 Sheets—Sheet 2
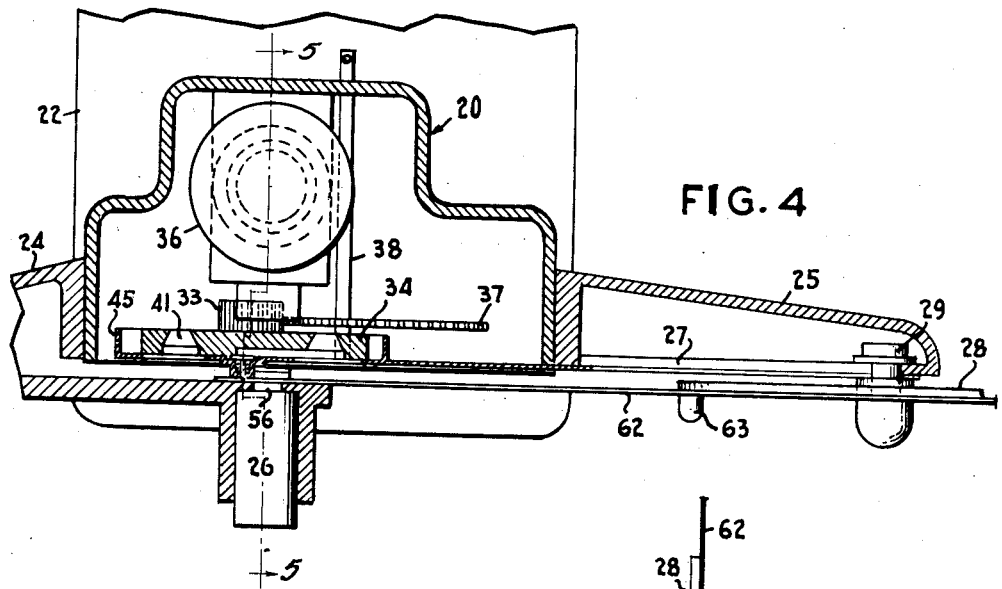
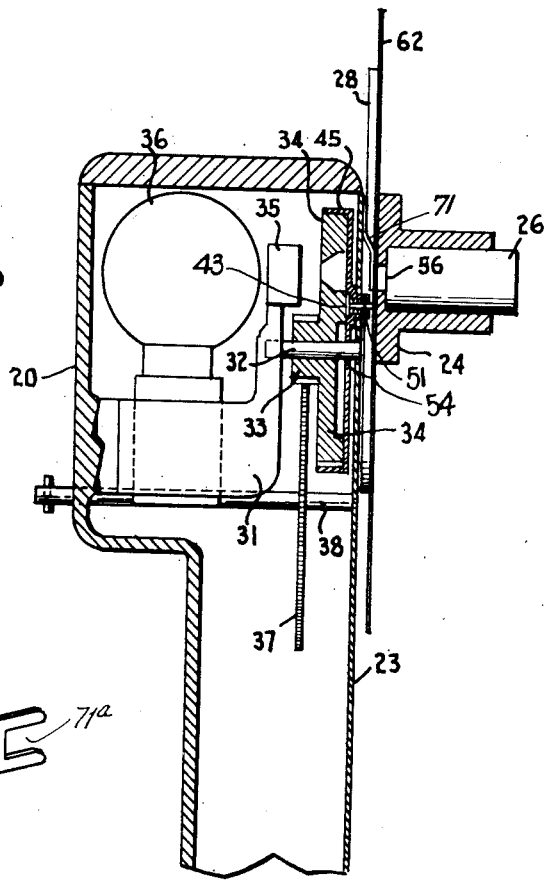
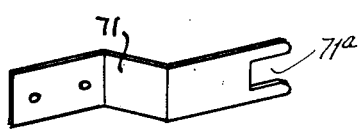

Jan. 17, 1939. A. R. DE TARTAS 2,143,867
MOTION PICTURE PROJECTOR
Filed March 25, 1936 3 Sheets-Sheet 3
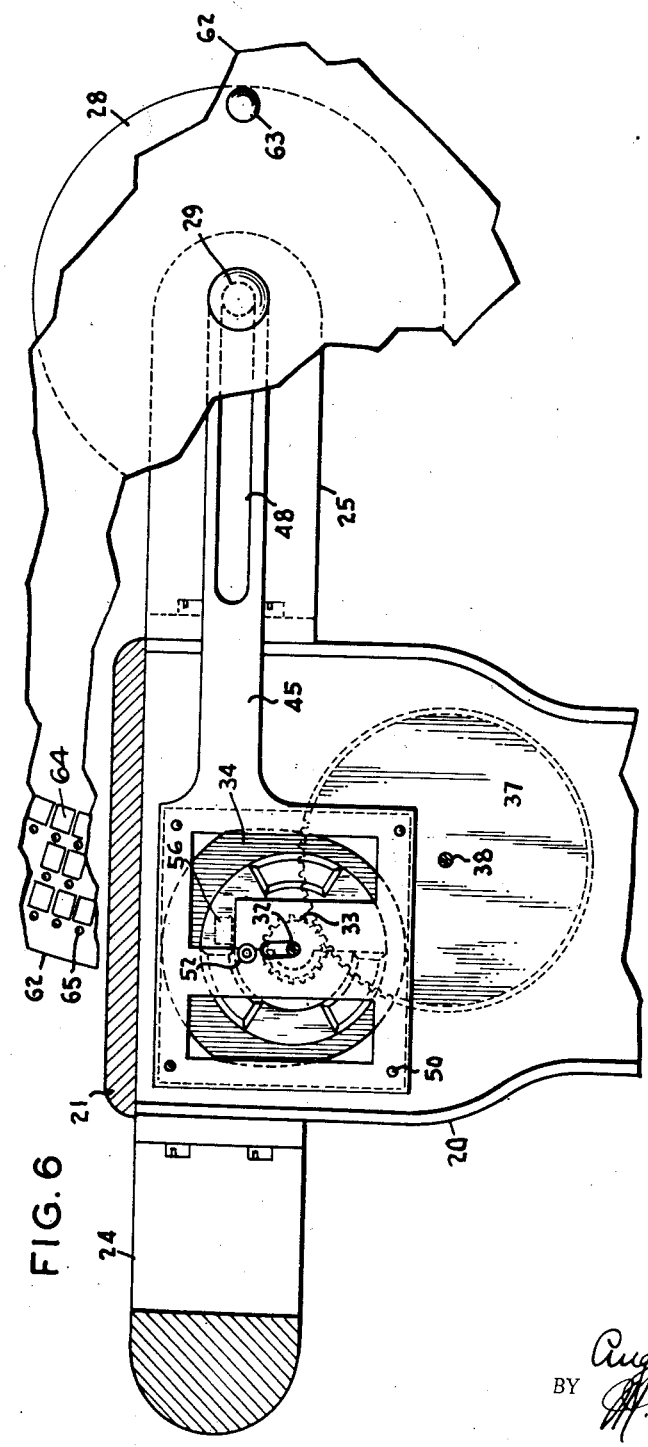
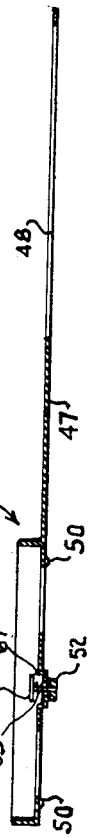
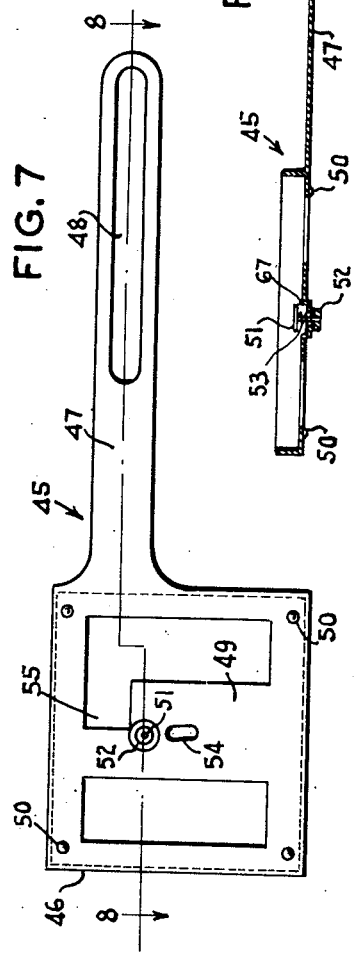
INVENTOR.
Augustus R. de Tartas
BY H. Theodore Simmons
ATTORNEY.

Patented Jan. 17, 1939

2,143,867

UNITED STATES PATENT OFFICE 2,143,867

MOTION PICTURE PROJECTOR

Augustus R. de Tartas, Flushing, N. Y.

Application March 25, 1936, Serial No. 70,807

13 Claims. (Cl. 88—18.8)

My invention relates to motion picture projectors, and more particularly to a type of projector especially adapted for amateur or home use or for advertising purposes, although certain features of the invention may also be used on motion picture cameras.

More particularly, the present invention relates to that type of projector in which the picture frames are arranged in spiral formation on a flat disc.

Among the objects of my invention are to provide a projector of the above indicated character which is small, compact, and economical to manufacture, and yet more efficient and accurate in operation than other projectors of this general character.

Further important objects of my invention are to provide a simple method of ensuring perfect framing of each and every picture on all the convolutions of the spiral; to provide a combined shutter and film feeding mechanism; and to provide new and novel arrangements of parts.

Other and further objects of my invention will be understood from the following specification taken in conjunction with the accompanying drawings, wherein—

Figure 1 is a top plan view of my improved projector;

Fig. 2 is a front elevation of the machine of Fig. 1 with parts broken away; and Fig. 3 is a side elevation of the machine of Fig. 1 also with parts broken away;

Fig. 4 is an enlarged cross section on the lines 4—4 of Fig. 2, with parts broken away;

Fig. 5 is an enlarged cross sectional view taken on the line 5—5 of Fig. 4, parts also being broken away;

Fig. 6 is an enlarged cross sectional view taken on the line 6—6 of Fig. 1, parts being broken away to facilitate the illustration;

Fig. 7 is a front elevation, and Fig. 8 is a horizontal cross section on the line 8—8 of Fig. 7, both views showing the film feeding device or actuator;

Fig. 9 is a front elevation and Fig. 10 is a vertical section, on the line 10—10 of Fig. 9, of the shutter showing the actuating cams; and Fig. 11 is a perspective view of the film tensioning device.

The machine is designed and intended to be composed of die cast parts with sheet metal cover and front plates. With the parts constructed as hereinafter outlined, the whole mechanism is very economical to produce and is inexpensively assembled into a compact but efficient mechanism.

In home picture projection by children and amateurs it is important that the mechanism be simple and rugged, as well as that the machine be easily operated and fool-proof. In arriving at the results, I have obtained the results sought by devising unique mechanisms and assemblies.

It has heretofore been recognized as advantageous to use the disc type of film for the projection of motion pictures. Among the reasons may be stated that a larger number of pictures can be placed upon a small disc (approximately 1400 on a ten inch disc and 2000 on a thirteen inch disc); and that such films are infinitely easier to handle, because eliminating the complex threading of the ribbon type of film, and to store, requiring only very small space and inexpensive storing media. The handling and storage of these discs may be compared to the handling and storage of disc type phonograph records.

In the past the picture frames have been arranged on the discs both in spiral formation and also in concentric rings but in both cases the mechanism for feeding the picture frames past the projection window have either been complicated, delicate and expensive, or they have been so inefficient that the pictures have not been properly framed in the window and therefore imperfect results have been obtained on the screen.

While preserving all of the advantages of such disc types of films, I have eliminated all of the disadvantages and objections to such machines and have simplified the operation as well as the mechanism thereof.

Referring to Figs. 1, 2 and 3, the machine comprises a casing 20 having a removable cover 21, a supporting base 22, and a removable cover plate 23. Projecting laterally from one side of the casing there is a U-shaped arm 24, constituting the lens mount, and from the opposite side of the machine a second U-shaped arm 25 forming the support for the film carrier. Arm 24 has mounted therein the usual projecting lens 26.

The arm 25 has a slot 27 in the front portion thereof. The film holder consists of a circular disc 28 mounted upon a bearing shaft 29 which is received and supported in the slot 27, but in such a way that the film carrier is free to move along the slot.

Referring now to Figs. 4, 5 and 6, a mounting arm 31 extends forwardly from the rear wall of the casing 20. Mounted in the end of the arm 31 is a shaft 32 carrying a pinion 33 and the combined shutter and actuator 34, the free end of the shaft being suitably journaled in the cover plate 23. A condenser lens 35 extends upwardly from the top of the arm 31, and the projection lamp 36 is also mounted in an appropriate socket in the same arm. Fast upon the shaft 38, which is journaled in the cover plate 23 and the rear wall of housing 20, is a spur gear 37 which meshes with the pinion 33. The shaft is operated from a crank 39, although of course it may be operated by any well known motor drive.

The shutter-actuator 34 is shown in detail in Figs. 9 and 10. In accordance with the usual, standard practice, the shutter portion is provided with three apertures 41, which are tapered from the front to rear. The rim of the shutter is weighted, to give a fly wheel effect as the shutter is rotated, and also it has a circumferential cam surface 42. The front face of the shutter is recessed within which portion is located a cam surface 43 of a depth to be at least flush with the outer surface of the shutter at its highest point. The cam 43 is approximately 180° in length and shaped with the center portion of its length of maximum height and tapered off on each end to the base level.

The actuator portion of the member 34 is formed by the cams 42 and 43 which cooperate to actuate the film feding mechanism about to be described. If desired, the pinion 33 and the shutter actuator 34 with its cams may be die-cast as one unit.

The film feeding mechanism comprises a feeder-link 45, shown in detail in Figs. 7 and 8. The feeder-link consists of an oblong-shaped portion 46 and a laterally projecting arm 47. The arm 47 has a slot 48 which is of a size to register with the slot 27 in the arm 25 and also the shaft 29 passes therethrough. The center portion of the oblong 46 is provided with a central rib 49 which carries a bushing 52 in which the claw pin 51 operates. The pin is normally pressed rearwardly by a spring 53 fitting in a recess in the bushing 52. The pin is so located that the head thereof will ride upon the cam 43.

Below the claw pin 51 is a slot 54 through which the shaft 32 passes, the slot being slightly larger at its upper end. The slot 54 is arranged on an angle corresponding to the composite radii of points along the slots 27 and 48. This construction of the slot compensates for differences in arcuate movements around the movable pivot 29 in the various positions of that pivot, as will be understood from the description of the operation. The rib 49 is cut away as indicated at 55 to allow ample clearance for the projection window 56 in all positions of the feeder-link 45. The indication of the window in Fig. 6 is to show its relative position, its actual location being shown in Fig. 5.

The oblong portion 46 of the feeder-link encloses the shutter actuator 34 as shown in Figs. 4 and 5. Thus, as the shutter is rotated, the cam 42 alternately engages the bottom and the top of the oblong portion 46 to move the feeder-link down and up. This movement will be at all times about the axis of the shaft 29 of the film carrier. To reduce frictional losses in this movement, the oblong portion 46 has in each corner a protuberance 50 which engages the cover plate 23 and in a measure guides the same during movement of the feeder-link.

A disc shaped film 62 is mounted upon the film carrier 28, the film having apertures to receive the head of the carrier shaft 29 and also a pair of diametrically spaced pins 63. When the film is mounted in place, it will extend between the window 56 and the cover plate 23. To insure that the film is free from wrinkles and bends as it passes in front of the window 56, a spring member 71 is fastened to the front cover plate 23 and arranged to press against the rear wall of the lens mount 24. The detail of this element 71 is shown in Fig. 11, from which it will be seen that the lower end has an opening 71a corresponding to the aperture 56. The film passes between the lower end of the spring 71 and the lens mount 24.

The pictures on the film are indicated at 64 and these are arranged in a spiral path progressing inwardly from the outer rim of the film 62. Alongside each picture and centrally located with respect thereto is an aperture 65 adapted to receive the claw pin 51. This arrangement is illustrated in Fig. 5, where it will be noted that the cam 43 has pressed the pin 51 forwardly until its head is received in the recess 67 (Fig. 3) in the feeder-link 45, and the pin itself has entered one of the apertures 65 in the film 62. The high portion of the cam is then engaging the pin and is of such length that further movement of the shutter-actuator 34 does not disturb the forward position of the pin. When the cam 42 engages and passes along the lower face of the oblong 46 the feeder-link is pressed downwardly carrying with it the claw pin 51 and the film 62.

As soon as the high part of cam 43 passes the head of the claw pin 51, the spring 53 moves the pin rearwardly in engagement with the tapered part of the cam. When the cam 42 engages and passes the top of the oblong 46 the pin is out of engagement with the film and the feeder-link is lifted carrying with it the claw pin 51. In due course the pin is again pushed into the next aperture 65. This operation continues progressively around the spiral of pictures 64.

Each time a given arc of the pictures is traversed, the radius of the spirally arranged pictures becomes shorter, and this is true of each picture. If each picture is to be properly presented to the projecting window 56 it becomes important to compensate for this ever changing radius, which is one reason the film carrier 28 is mounted in the slot 27 and is free to slide therealong, and for the arrangement of my mechanism. With each operation of the feeder-link and of the claw pin 51 in bringing a new picture 64 before the window 56, the film carrier 28 is moved gradually inwardly along the slot 27, and the registering slot 48. There is sufficient friction between the shaft 29 and the sides of the slots to maintain the shaft 29 in its advanced position and the feeder-link 45 will continue to oscillate about the shaft 29 of the film carrier, regardless of its position along the slots 27, 48. Thus, the radius of the movement of the claw pin 51 always matches exactly the radius from the center of the film carrier 28 to a point alongside each of the pictures, so that each picture of the entire spiral becomes properly framed for projection on a screen (not shown) regardless of the ever changing radius.

If desired, the film may be held upon the film carrier 28 by means of the clip 72 (Figs. 1 and 2) each end of which is forked and adapted to fit in a slot in each of the pins 63, the clip 72 extending outwardly to form a convenient handle. Thus, the film 62 is quickly and simply mounted and easily detached and replaced.

It will be apparent that sound tracks could be substituted for the individual picture frames or could be operated in conjunction therewith by the addition of the necessary sound projection mechanism. Also, the feed mechanism would be speeded up so that the film would be fed more smoothly than is necessary for picture projection only.

Other modifications may be made in the arrangement and location of parts within the spirit and scope of my invention, and such modifications are intended to be covered by the appended claims.

I claim:

1. A motion picture projector comprising a casing, a projection lamp and cooperating lens system mounted thereon, a rotatable shutter having a cam surface thereon, gearing for operating said shutter, a disc type of film having pictures serially arranged thereon, a film carrier slidably mounted on said casing, and a movable feeder-link cooperating with said film carrier and actuated by the cam surface of said shutter to slidably move said film carrier, the feeder-link being provided with means which compensates for the variations in radii between the center of the disk and the optical center of the lens system.

2. A motion picture projector comprising a casing, a projection lamp and cooperating lens system mounted thereon, a rotatable shutter having a peripheral cam surface and a laterally projecting cam surface, gearing for operating said shutter, a disc type of film having pictures spirally arranged thereon and an aperture alongside each of said pictures, a film carrier slidably mounted on said casing, and a feeder-link pivotally cooperating with said film carrier to move the same and having a claw pin mounted for movement therein into and out of engagement with said apertures, the claw pin being moved by the laterally projecting cam and the feeder-link being moved by the peripheral cam.

3. A motion picture projector comprising a casing, a projection lamp and cooperating lens system mounted thereon, a rotatable shutter, gearing for operating said shutter, a disc type of film having pictures spirally arranged thereon and an aperture alongside each of said pictures, a film carrier slidably mounted on said casing, a feeder-link cooperating with said film carrier to move the same and having a claw pin mounted therein cooperating with said apertures to rotate said film disc, and means for operating the feeder-link to move the film carrier to accurately register each picture of the spiral with the lens system, and compensating means operated by the feeder-link for compensating for the variations in radii between the center of the disk and the optical center of the lens system as the film carrier slides.

4. A motion picture projector comprising a casing, a rotatable shutter having a peripheral cam surface and a laterally projecting cam surface, gearing for operating said shutter, a disc type of film having pictures spirally arranged thereon and an aperture alongside each of said pictures, a film carrier slidably mounted on said casing, and a movable feeder-link pivotally mounted about a portion of said film carrier and having a claw pin movably mounted thereon, the feeder-link projecting so as to be engaged by the peripheral cam to raise and lower the same about its pivot and so that the laterally projecting cam engages the claw pin to alternately move the same in and out, the feeder-link being provided with means which compensates for the variations in radii between the center of the disk and the optical center of the lens system.

5. A motion picture projector comprising a casing, a rotatable shutter having a peripheral cam surface and a laterally projecting cam surface, gearing for operating said shutter, a disc type of film having pictures spirally arranged thereon and an aperture alongside each of said pictures, a slotted arm mounted on said casing, a film carrier having a shaft slidably mounted in the slotted arm, a feeder-link comprising an oblong portion embracing the shutter and its cams and a slotted arm portion the slot of which registers with the slot in the first mentioned arm, the feeder-link being free to move about the shaft of the film carrier, and a claw pin carried by the feeder-link and mounted for movement therein under the action of one of said cams.

6. A motion picture projector comprising a casing having a base, a cover, a cover plate, and a pair of laterally projecting arms, one of said arms constituting the lens mount, a lens mounted therein, the other of said arms being slotted, a film carrier having a shaft rotatably and slidably received in said slot, a disc type of film mounted on said carrier and having pictures arranged thereon, and an arm within said casing having a shutter rotatably mounted thereon, gearing for operating said shutter, a projection lamp and condensing lens mounted within the casing, and means for feeding the film to register the pictures with the lens system and to slide the film carrier along its arm, the feeder-link being provided with means which compensates for the variations in radii between the center of the disk and the optical center of the lens system.

7. A motion picture projector comprising a casing having a base, a cover, a cover plate, and a pair of laterally projecting arms, one of said arms constituting the lens mount, a lens mounted therein, the other of said arms being slotted, a film carrier having a shaft rotatably and slidably received in said slot, a disc type of film mounted on said carrier and having pictures arranged thereon, an arm within said casing having mounted thereon the socket for the projection lamp, a shaft, a pinion and shutter mounted on said shaft, and a condensing lens, a gear meshing with said pinion, a shaft upon which said gear is mounted, means for operating said shaft, and means for feeding the film to register the pictures with the lens system and to slide the film carrier along its arm, the feeder-link being provided with means which compensates for the variations in radii between the center of the disk and the optical center of the lens system.

8. A motion picture projector comprising a casing having a base, a cover, a cover plate, and a pair of laterally projecting arms, one of said arms constituting the lens mount, a lens mounted therein, the other of said arms being slotted, a film carrier having a shaft rotatably and slidably received in said slot, a disc type of film mounted on said carrier and having pictures arranged thereon and an aperture alongside each picture, an arm within said casing having mounted thereon the socket for the projection lamp, a shaft, a pinion and shutter mounted on said shaft, and a condensing lens cooperating with the lamp, the shutter having a laterally projecting cam and a peripheral cam, a gear meshing with said pinion, a shaft upon which said gear is mounted, means for operating said shaft, and a feeder-link having a portion embracing the cam surfaces of said shutter and a claw pin positioned to be engaged by the laterally projecting cam and moved thereby, the feeder-link having a slotted arm extending coincidentally with the slotted arm of the casing and likewise embracing the shaft of the film carrier.

9. A motion picture projector comprising a film having pictures spirally arranged thereon, a film carrier having a bearing, a pivoted feeder-link having a slotted arm which engages and pivots upon the bearing on said film carrier, and means for moving the feeder link to progressively slide the film carrier bearing through the slot to vary the pivot point for the feeder-link.

10. In a motion picture projector, a casing, a slotted arm on said casing, a film having pictures spirally arranged thereon, a film carrier having a rotatable shaft slidable in said slotted arm, and means for slidably moving said carrier comprising a feeder-link having a slotted arm which engages and pivots upon the shaft of said film carrier to vary the pivot point for the feeder-link as the shaft slides in said arm.

11. In a motion picture projector, a casing, a slotted arm on said casing, a film having pictures spirally arranged thereon, a film carrier having a rotatable shaft slidable in said slotted arm, and means for moving said film and carrier comprising a feeder-link having a claw-pin and a slotted arm which engages and pivots upon the shaft of said film carrier to vary the pivot point for the feeder-link and the radial movement of the claw-pin as the shaft slides in said arm.

12. A motion picture projector, a disc type of film having pictures spirally arranged thereon and an aperture alongside each of said pictures, a casing, a slotted arm on said casing, a film carrier having a rotatable shaft slidably mounted in the slotted arm, a feeder-link having a claw-pin that engages the apertures in the film disc to move the same and also having a slotted arm portion which engages the shaft on said film carrier and coordinating therewith to synchronize the movement of the claw-pin with the radial position of the spirally arranged pictures on the film disc, and means to move the feeder-link and film disc.

13. A motion picture machine, a casing, a slotted arm mounted on said casing, a disc type of film having pictures spirally arranged thereon and an aperture alongside each of said pictures, a film carrier upon which the film is mounted and having a bearing, a feeder-link having a slotted arm which engages and pivots upon said bearing, a claw-pin carried by the feeder-link for engaging the film apertures, means for moving claw-pin and feeder-link, said pivotal point of the feeder-link slotted arm coordinating with the claw-pin to operate with the changing radii of the pictures on the film disc.

AUGUSTUS R. DE TARTAS.